United States Patent [19]

Chapman

[11] Patent Number: 4,630,791
[45] Date of Patent: Dec. 23, 1986

[54] TRANSPORTABLE SOLAR POWER STATION

[75] Inventor: Malcolm R. Chapman, Melville, N.Y.

[73] Assignee: Grumman Aerospace Corporation, Bethpage, N.Y.

[21] Appl. No.: 546,441

[22] Filed: Oct. 28, 1983

[51] Int. Cl.[4] .............................................. B64G 1/44
[52] U.S. Cl. ................................ 244/173; 244/158 R; 136/245; 136/292
[58] Field of Search .......................... 244/158 R, 173; 136/245, 292

[56] References Cited

U.S. PATENT DOCUMENTS 3,460,992  8/1969  Avilov et al. ....................... 244/173
4,133,501  1/1979  Pentlicki ............................. 244/173

FOREIGN PATENT DOCUMENTS 2103011  2/1983  United Kingdom ................ 244/173

OTHER PUBLICATIONS

"A Programmable Power Processor for a 25 KW Power Module", R. E. Kapustka and J. R. Lanier, Jr., PESC Conference Record, Syracuse NY, Jun. 13-15, 1978, pp. 76-80.

"A Power Extension Package for the Shuttle Orbiter", H. C. Ness, Proceedings of the 14th Intersociety Energy Conversion Engineering Conf., Boston, Mass., Aug. 5-10, 1979, pp. 1237-1240.

*Primary Examiner*—Trygve M. Blix
*Assistant Examiner*—Rodney Corl
*Attorney, Agent, or Firm*—Richard G. Geib; Daniel J. Tick; Bernard S. Hoffman

[57] ABSTRACT

A space-based solar operated power module is configured for storage aboard a shuttle and then automatic deployment in the assigned orbit. It includes an articulated base support which is coupled to the ship's frame during deployment, and a chassis module, which also serves as a housing for electrical components of the power supply, and which is connected to the base support. A pair of oppositely extended foldable arms are movably mounted on the chassis sides and each carries an assembly of collapsible solar panels for converting incident radiant energy to electrical energy. The chassis also supports radiator panels which extend from the top of the chassis in the craft's vertical plane. At the start of deployment the shuttle's remote controlled cargo arm is used for lifting the chassis and its appendages from the hold of the ship. A trapeze and ring assembly along with a berthing adapter, forming a part of the base support, are then used for engaging the chassis to the shuttle's frame and moving the chassis to an overhead position. The solar panel assemblies, still folded, are then rotated outboard 90 degrees. The foldable arms, configured as linkages, thereafter expand outwardly from the side of the chassis for deployment of the solar panel assemblies. The entire station is then moved to a forward position after which the panel assemblies are unfurled.

3 Claims, 3 Drawing Figures

TRANSPORTABLE SOLAR POWER STATION

BACKGROUND OF THE INVENTION

This invention relates to solar power sources used with space vehicles and space structures and, more particularly, to such power sources having automated articulated deployment systems which permit them to be transported fully constructed to their assigned space sites.

Attempts to meet these specifications have met with limited success in that for a given capacity power source, known deployment mechanisms occupy substantially more stowage space aboard the ship than is desirable.

SUMMARY OF THE INVENTION

The foregoing problem is ameliorated and other advantages are provided by a power source having an automated and compact deployment system for deploying the solar components of the power station to an operative position from a stowed location within the cargo bay of the transporting shuttle.

Besides eliminating construction at the site, with all its problems and complications, the system permits full checkout of the power station before launch.

In accordance with the invention, the deployment system includes an articulated base support used for moving a chassis out of the hold and clear of the orbiter; the chassis also serves as the housing for electrical components of the station and for other systems (communications, etc.). Extendable arms are movably mounted on the chassis sides and carry at their ends sets of collapsible solar panels. The panel arms are rotatably mounted on each side of the chassis, being configured to be folded snugly against the side of the chassis when in the stowed position and to extend out at right angles thereto for deploying the solar panels. The latter, which are collapsed accordion-fashion during stowage, may then be opened for operation.

This entire assembly is configured to fit compactly within the hold of the space craft during the initial trip into orbit. The base support, which includes a ring and trapeze arrangement is articulated such that when the bay doors have been opened the chassis with its folded solar arms and assemblies can be lifted out of the hold by the shuttle's cargo arm and linked to a berthing point secured to the shuttle's frame. The chassis is then sequenced through several positions during which the panel arms and panels can be deployed in their operational positions.

DESCRIPTION OF THE DRAWINGS

The foregoing features and other aspects of the invention are explained in the following description taken in connection with the accompanying drawings wherein.

DESCRIPTION OF THE PREFERRED EMBODIMENT

Figure 1:
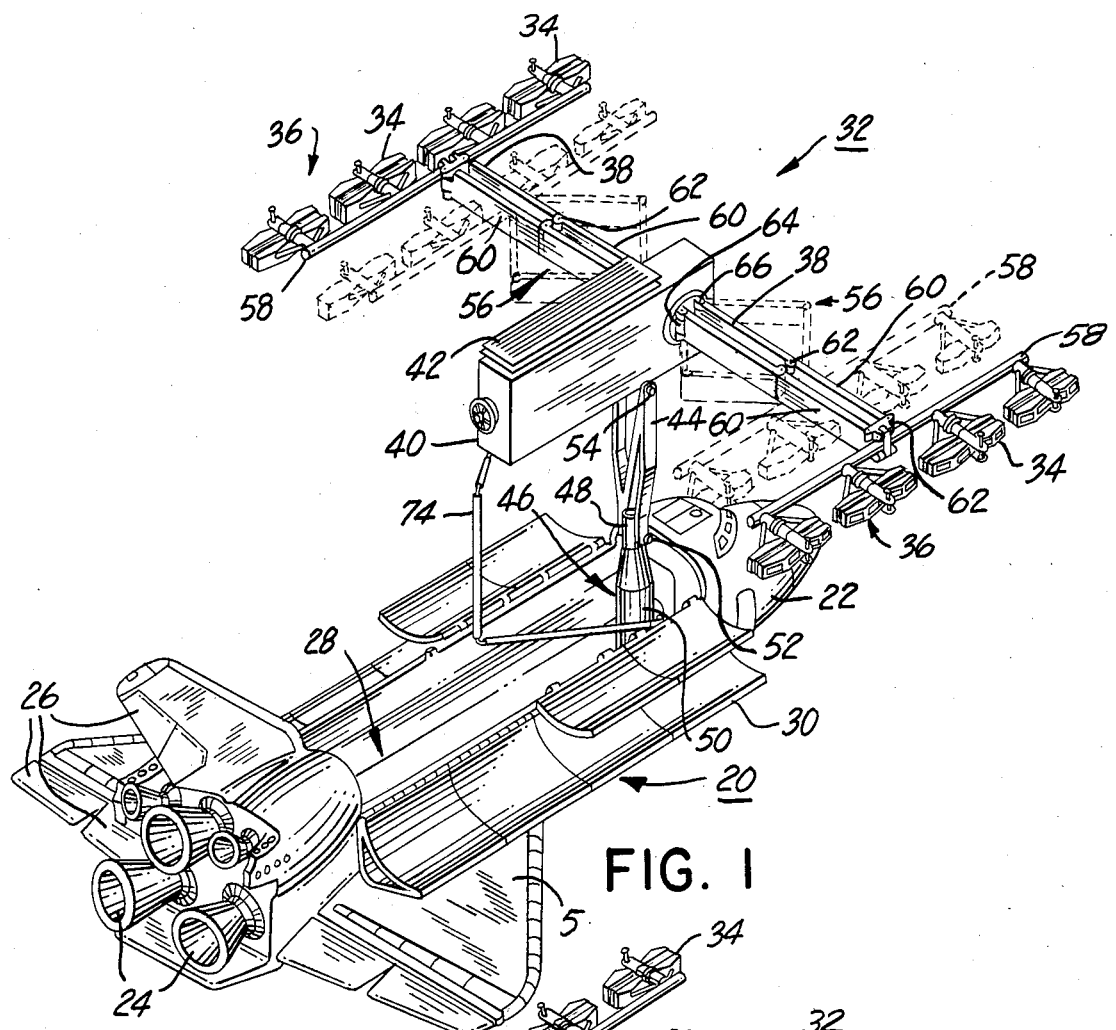
FIG. 1 is a partially schematic perspective diagram showing a spaceship carrying a solar power supply and its deployment system.

Referring now to the figures, spacecraft 20 having a cabin 22 and wings 5 is equipped with rocket engines 24 located at the aft end. Control surfaces 26 are provided for directing the spaceship 20 during atmospheric flight.

A hold 28 is located amidships of the shuttle with bay doors 30 for providing access and permitting deployment of solar power source 32 stowed within the hold.

The power station 32 includes a chassis 40, solar panel arms 38 rotatably connected to an orientation control section 63 of the chassis and two solar panel assemblies 36, each containing a set of panels 34 mounted on a tube 58 which is rotatably attached to the respective extensible arm 38. An expandable assembly 42 of radiator panels is advantageously mounted on the top of the chassis 40 for deployment by extension in the craft's vertical plane. In addition to power supply components, chassis 40 may also house power storage, thermal control, communication, stabilization control and other systems or subsystems.

For deployment, one of the shuttle's cargo arms 74 engages the chassis 40, e.g. the top surface, for a displacement of the system from the hold 28. A trapeze link 44 is attached at one end via a pivot assembly 54 to chassis 40 and at the other end to a berthing ring 48 for engaging a berthing post 46 of the shuttle. Initially the trapeze link 44 is parallel to and entending in the forward direction of the chassis' longtitudinal axis. As the chassis is lifted out of the hold, the trapeze link rotates toward the position shown in FIG. 1, with the chassis remaining parallel to the shuttle's fore-aft axis.

The panel arms 38 are connected at their inboard ends to the sidewalls of the chassis 40, and at their outboard ends carry the mounting tubes 58. The tubes 58 are rotatably secured to the arms for rotation of the panel assemblies 36 from a position pointing toward the deck of the hold 28 during stowage to an outwardly extending position after the chassis has been positioned as shown in FIG. 1 and while arms 38 are still contracted. This is accomplished by engaging the center section of each tube 58 with an appropriate drive element forming a part of the orientation control system 63. The latter is preferably an electrical drive which also serves the tracking function.

Each panel arm 38 is formed of two members 60 which in turn are each formed of two links 60a, 60b pivotally interconnected to each other to form a scissor linkage. Pivot assemblies 66 interconnect the members 60 to the chassis drive 63 while pivot assemblies 62 provide connection to mounting tubes 58. As indicated by the phantom view in FIG. 1, the tubes 58 and their assemblies 36 are deployed from a retracted position adjacent chassis 40 to a fully extended position. This occurs when the chassis 50 reaches the position shown in FIG. 1. This extension may be accomplished by a suitable drive element of controller 63 which is coupled to pivot assemblies 66 on the inboard ends of the arms 38. While a scissor type assembly is illustrated, it should be understood that a lazy tong or other linkage can be utilized to provide the required extension which in the illustrated design is 456 inches for each arm.

The solar-panel assembly 36 illustratively comprises a four-section panel, it being understood that a different number of sections may be utilized if desired. In the illustrated embodiment the panels are designed to provide a source rated at 25 KW.

Figure 2:
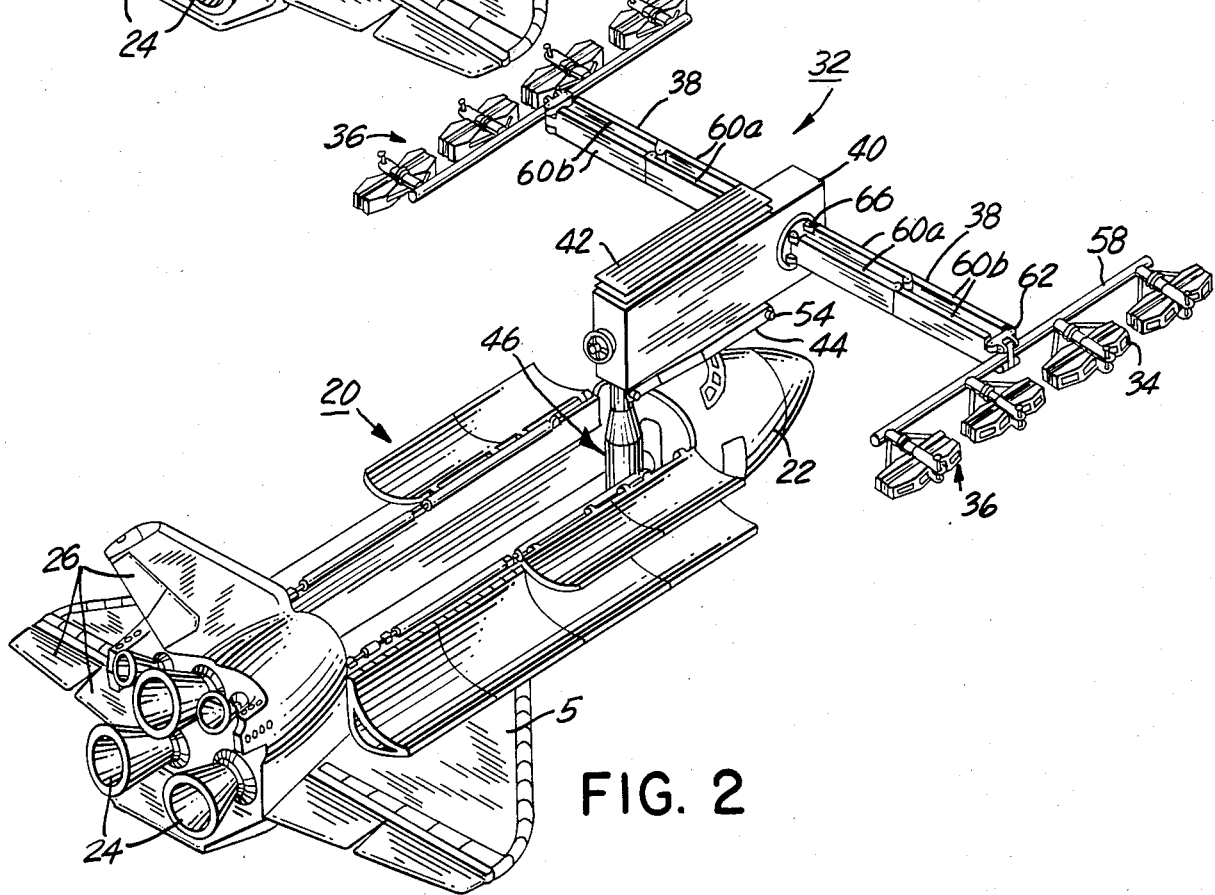
FIGS. 2 and 3 are partially schematic perspective diagrams showing successive stages in the operation of the deployment system for lifting the power supply station out of the hold, for extending the panel carrying arms, and for opening the solar-panel assemblies.
Figure 3:
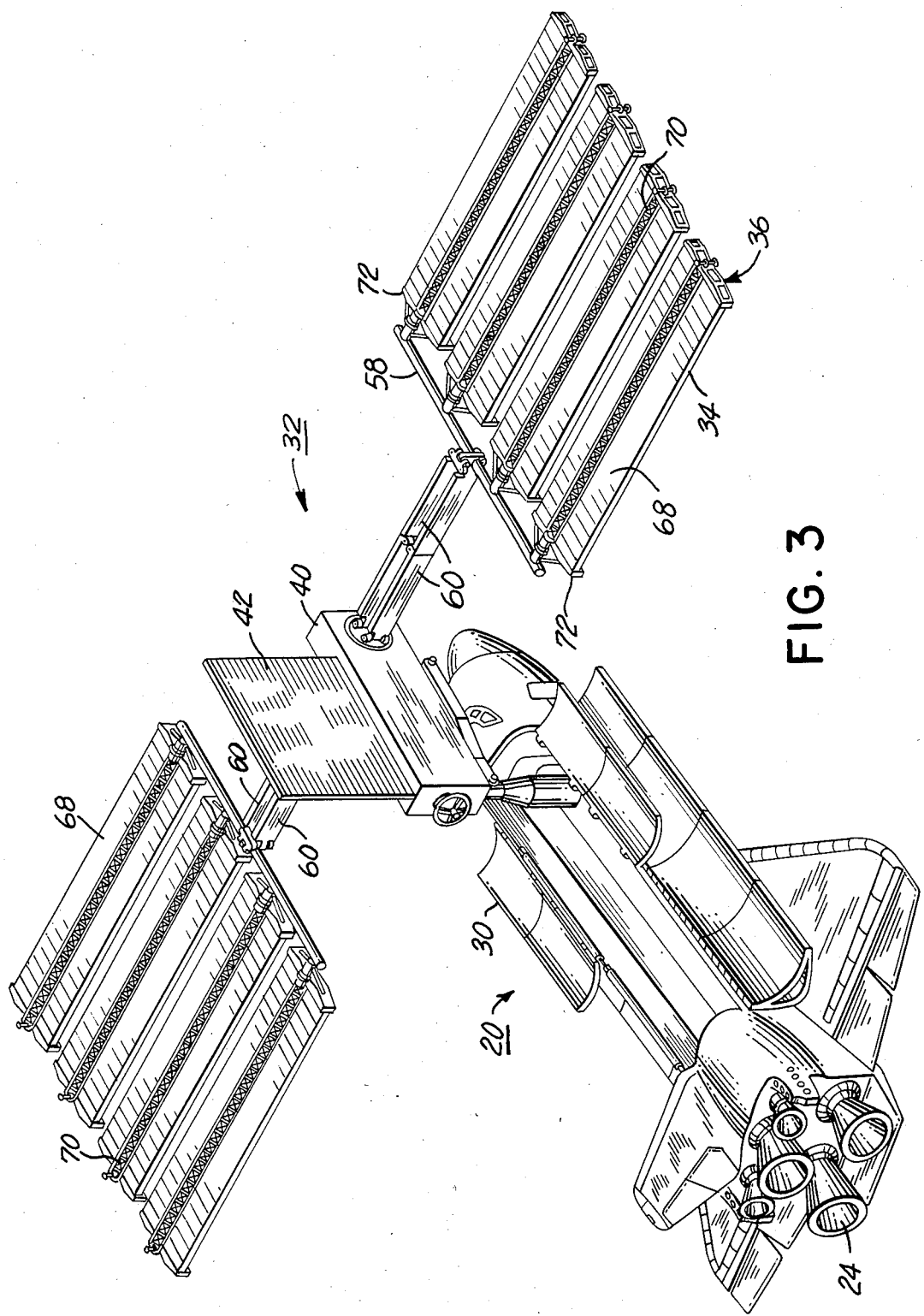

Referring to FIG. 3, the panels 34 of each assembly are composed of photoelectric material arranged on leaves 68 which are linked together and unfurled by a suitable system, e.g. astro mast mechanisms 70 whereby, upon extension of each panel 34, the individual leaves 68 are opened for exposure to the sunlight. The extension may be accomplished by alternate means including fluid pressure applied to passages in the leaves or to a separate telescoping or uncoiling assembly which displaces the leaves. Unfurling occurs after the station has been displaced forwardly as shown in FIGS. 2, 3.

Electric wiring (not shown in the Figures) may be carried from the leaves 68 of the panels 34 through the interior of the tubes 58, and between the members 60 of the arms 38 to the chassis 40.

It is to be understood that the above described embodiment of the invention is illustrative only, and that modifications thereof will undoubtedly occur to those skilled in the art.

What is claimed is:

1. A solar operated power station for space operation transportable in a spacecraft having a hold with a deck, said power station comprising:

a chassis module containing electrical components and circuits of said station and drive system;

articulated base support means movably interconnecting said chassis and said spacecraft to guide the displacement of said chassis from said craft;

a pair of opposing extensible arms each movably connected at its inboard end to a corresponding side of said chassis for operation by said drive system and extensible outwardly from said chassis side when driven by said drive system, each of said arms having two members and each of said members having two links pivotally interconnected to each other to form a scissor linkage;

panel support tubes rotatably mounted transversely of each arm at an outboard end thereof, said panel support tubes being configured to be driven by said drive system when said arms are folded against the chassis sides; and an assembly of solar panels supported by each of said panel support tubes, each of said solar panel assemblies being configured for packing in a stowed position and including extender means for depolying solar cells of said panel assembly from a retracted position adjacent said chassis to a fully extended position for intercepting rays of sunlight, said tubes being secured to said arms for rotation of said solar panel assemblies from a position pointing toward the deck of the hold during stowage to an outwardly extending position after said chassis has been positioned.

2. A solar operated power station as claimed in claim 1, wherein said craft has a berthing post with a berthing ring and further comprising a trapeze link attached at one end via a pivot assembly to said chassis and at the other end to said berthing ring.

3. A solar operated power station as claimed in claim 1, further comprising an expandable assembly of radiator panels advantageously mounted on the top of said chassis for deployment by extension.

* * * * *